United States Patent

[11] 3,610,168

| [72] | Inventor | Franklin S. Macomber<br>Park Ridge, Ill. |
|---|---|---|
| [21] | Appl. No. | 759,465 |
| [22] | Filed | Sept. 12, 1968 |
| [45] | Patented | Oct. 5, 1971 |
| [73] | Assignee | A. T. Kearney & Company, Inc.<br>Chicago, Ill. |

[54] APPARATUS FOR PIGGYBACK RAIL TRANSPORTATION
3 Claims, 9 Drawing Figs.

[52] U.S. Cl. ............................................. 105/368 B,
105/159, 214/38 A, 214/152
[51] Int. Cl. ............................................. B61d 3/10,
B65j 1/14
[50] Field of Search ............................................. 105/368 B,
159; 214/38.1, 38.8, 152

[56] References Cited
UNITED STATES PATENTS

| 2,121,181 | 6/1938 | Bayerl | 105/368 B |
| 2,837,037 | 6/1958 | Holmberg | 105/368 B |
| 2,883,945 | 4/1959 | Walker | 105/368 B |
| 2,884,870 | 5/1959 | Day | 105/368 B |
| 3,019,917 | 2/1962 | Ajero | 105/368 B |
| 3,297,178 | 1/1967 | Bohlen | 214/38 (.10) |
| 2,638,852 | 5/1953 | Bannen | 105/159 |
| 2,782,733 | 2/1957 | Ewing | 105/159 |
| 2,963,986 | 12/1960 | Dobson | 105/159 |
| 2,992,621 | 7/1961 | Schoen | 105/368 B |

*Primary Examiner*—Drayton E. Hoffman
*Attorney*—Gary, Parker, Juettner, Pigott & Cullinan ABSTRACT: An improved "piggyback" train comprising a plurality of elongated rail trucks connected by push-pull tubes or beams or the like and designed so that each truck will support the wheels of one highway trailer and also the nose of another trailer, the rail trucks having a dropframe design so as to support the trailers in close proximity to the tracks.

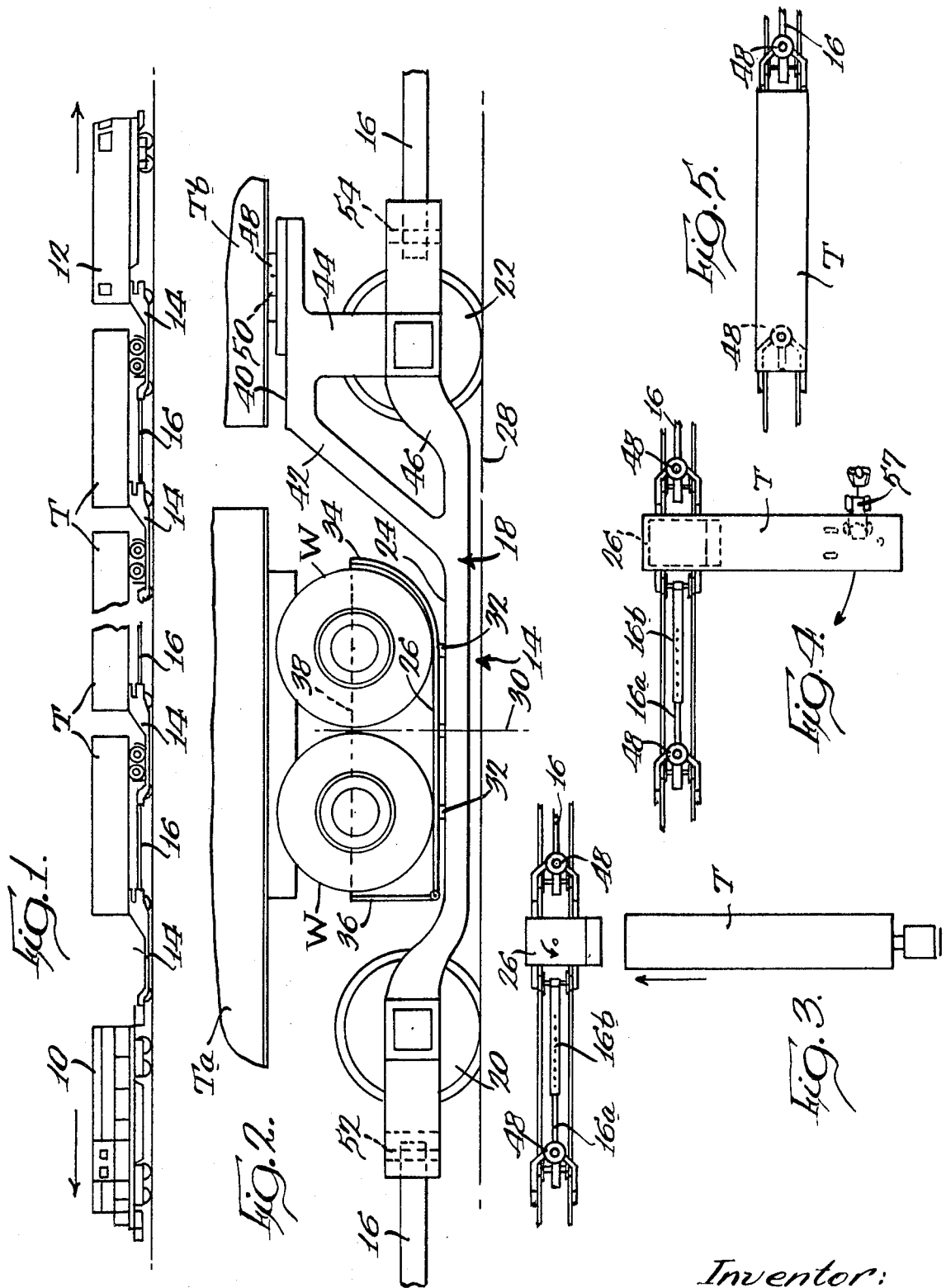

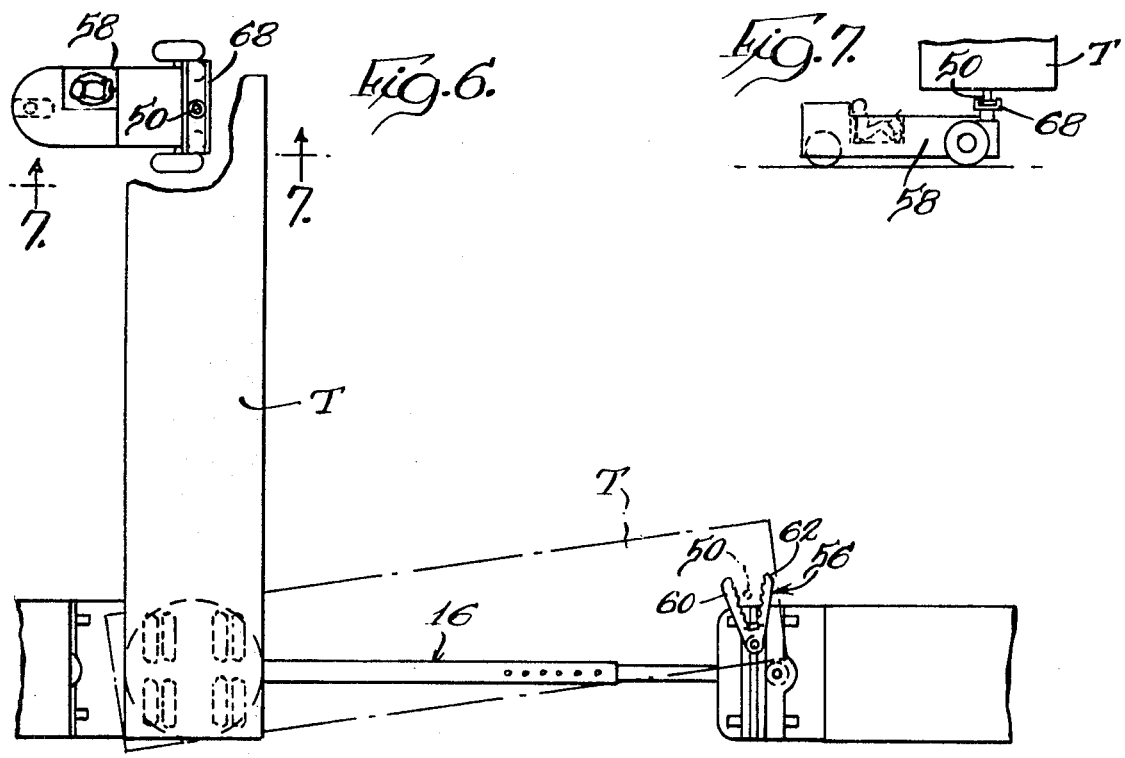
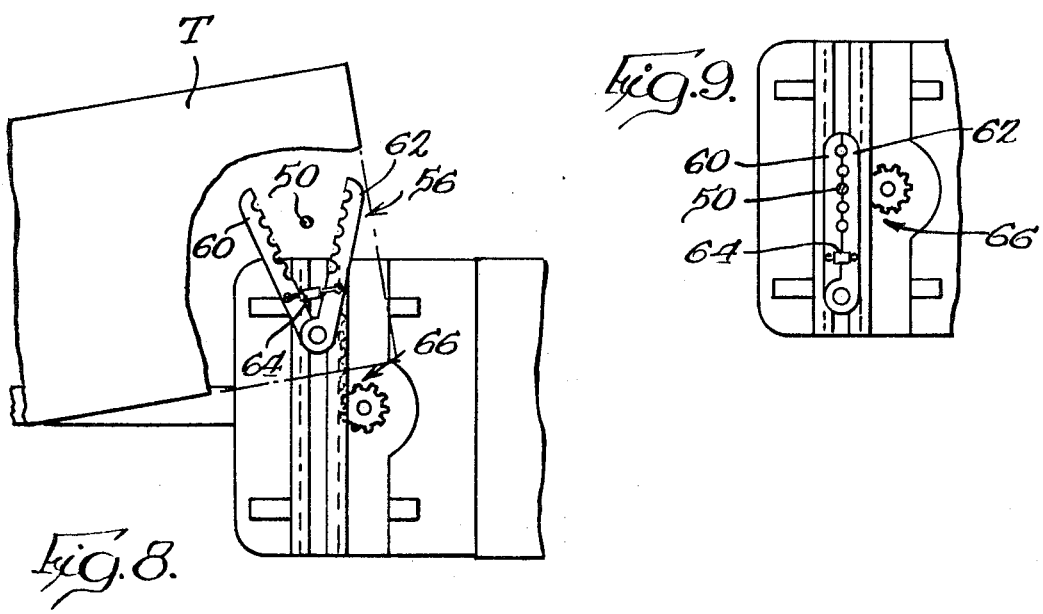

3,610,168

APPARATUS FOR PIGGYBACK RAIL TRANSPORTATION

BRIEF SUMMARY OF THE INVENTION

The present invention relates to an improved type of "piggyback" train for transporting highway trailers without requiring removal of the bogie or wheel assembly from the trailer. Heretofore, railroad cars for "piggyback" trains have generally been of a conventional flattop design comprising a long flat car supported by truck or wheel assemblies at each end thereof. Such cars have been coupled together in conventional fashion in order to make up a train of "piggyback" cars, and it is customary to make each car long enough to accommodate two highway trailers.

One disadvantage of the foregoing conventional "piggyback" car is that a typical car weighs about 70,000 pounds, which means a car weight of about 35,000 pounds for each trailer carried. Consequently, such railroad cars are quite heavy, as well as being relatively expensive. Moreover, because the trailers are disposed on the flat top surface of the car above the car wheels, the trailers are disposed at a considerable height and substantial clearances are required.

The usual method for loading of conventional flattop "piggyback" cars of the type described above is referred to as ramp loading and involves coupling together a series of cars and then using a tractor to move the trailers onto the cars at one end thereof and then along the entire series of coupled cars until the trailer is disposed as far along the train as possible. In other words, the first trailer to be loaded must be moved onto the train at one end thereof and then moved from one car to another along the length of the entire train to the other end thereof, and the next trailer must be moved the same distance less one-half car length, etc.

In some cases, to facilitate loading and unloading of such trains, the trains may be broken up into sections, but of course this operation in itself takes a considerable length of time. Moreover, each car must be equipped with heavy decking so that a trailer can be rolled over the cars and from one car to another, all of which increases the weight and expense of the railroad car. It will further be understood that if it is desired to unload a train of the foregoing type in any sequence other than the sequence in which the trailers are positioned on the train, very expensive heavy equipment such as cranes or the like are required to lift selected trailers off one side of the cars on which they are mounted.

It is an object of the present invention to provide an improved type of "piggyback" train comprising a plurality of elongated trucks connected together by tubes or beams or the like so as to very substantially reduce the weight of the train as well as the cost thereof.

A further object of the invention is to provide elongated rail trucks as last above mentioned each of which will support the wheels of one highway trailer and the nose of another trailer, whereby the trailer itself serves as a bridge between two of the rail trucks and the car body is in effect eliminated.

Another of my objects is to provide an elongated rail truck as described above which is of a dropframe design so that a highway trailer transported thereon is disposed relatively close to the tracks thereby requiring substantially less clearance than conventional "piggyback" cars.

An additional object of the invention is to provide a turntable on the top of the dropframe rail truck to facilitate side loading of a trailer on the car as well as side unloading of the trailer without need for any special equipment other than an inexpensive tractor or the like.

The foregoing and other objects and advantages of the invention will be apparent from the following description of a preferred embodiment thereof, taken in conjunction with the accompanying drawings.

DESCRIPTION OF THE DRAWINGS:

FIG. 1 is a side elevational view of a "piggyback" train comprised basically of a plurality of elongated dropframe rail trucks interconnected by tube or beam members in accordance with the principles of the present invention;

FIG. 2 is a side elevational view of one of the elongated dropframe rail trucks constructed in accordance with the present invention, showing the manner in which the truck supports the wheels of one highway trailer and also supports the nose of the next highway trailer;

FIGS. 3, 4 and 5 are sequential top plan views of one embodiment of the invention where a turntable is mounted on the rail truck to facilitate loading and unloading from the side thereof, such views showing the sequence of backing a highway trailer onto the turntable and then swinging the trailer around until it is disposed in line with the rail truck as shown in FIG. 5;

FIG. 6 is a top plan view showing another embodiment of the present invention where each rail truck is equipped with a clawlike gripper member for engaging the kingpin at the forward end of a trailer and pulling the same inwardly to an in-line position;

FIG. 7 is a side elevational view of a tractor member which can be operated to lift the nose end of a trailer off the ground and move the same in an arcuate path from the solid position of FIG. 6 to a position as shown in dash-dot lines therein, the clawlike gripper being adapted to complete the movement of the trailer to its in-line position; and FIGS. 8 and 9 are top plan views showing the manner in which the gripper member of FIG. 6 completes movement of a trailer to an in-line loaded position and retains the same therein.

Now, in order to acquaint those skilled in the art with the manner of making and using my invention, I shall describe, in conjunction with the accompanying drawings, certain preferred embodiments of the invention.

DETAILED DESCRIPTION OF THE INVENTION

Referring now to the drawings, there is shown in FIG. 1 a train comprising an engine 10, a rear car 12, and a plurality of rail trucks 14 connected to one another by connecting rods 16. It will be seen that the foregoing train is designed for "piggyback" transportation of highway trailers T, and each of the rail trucks 14 supports the wheels of one trailer T and the nose of another trailer T. In essence, there are no car bodies as such, since apart from the engine 10 and the rear car 12, the train is comprised of the elongated rail trucks 14 and the connecting rods 16 which interconnect the trucks, while the highway trailers T which are being transported bridge the length between adjacent rail trucks.

FIG. 2 shows a rail truck 14 which is of a dropframe type having a main frame 18 supported for rolling movement on conventional track by a pair of forward wheels 20 and a pair of rear wheels 22. Because of the dropframe design of the rail truck 14, there is provided a lower platform 24 which is disposed substantially below the horizontal axes of the wheels 20 and 22. In the particular embodiment being described herein, a turntable 26 is supported on the lower platform 24, and the wheels W of the trailer T are supported on the turntable 26 at a height approximately 18 inches above the rail tracks 28. Thus, assuming that the trailers T have a height of 12 feet, 6 inches, the total clearance required is only 14 feet.

The turntable 26 is mounted so as to be rotatable about a central vertical axis 30, and the turntable is supported above the lower platform 24 by suitable bearings or rollers 32, preferably a ring-type roller bearing, so as to permit rotation of the turntable for purposes of loading and unloading, as will be described more fully hereinafter. The turntable 26 includes arcuate backup shoes 34 at the rear thereof, and the trailer T is positioned on the turntable 26 so that the trailer wheels W approximately abut the backup shoes 34, whereby the latter assist in firmly securing the trailer in its loaded position on the rail truck 14. Each turntable 26 is further provided with a ramp 36 at its forward end. Each ramp 36 can be pivoted to a lowered position for loading and unloading, as will be described more fully hereinafter, and the ramps are pivoted to upper retracted positions as shown in FIG. 2 when the train is in operation. The turntables 26 are preferably provided with a pair of sidewalls 38 for the purpose of enclosing the trailer wheels W and assuring that the trailer wheels are safely retained in position on the turntable.

In addition to the lower platform 24, each of the elongated rail trucks 14 includes a raised platform 40 located at the rear end of the truck, the raised platform being disposed approximately above the rear truck wheels 22 in the embodiment being described herein. The raised platform 40 may be an integral part of the basic truck frame 18 and is supported by the inclined frame portion 42 and a generally vertical frame portion 44, the latter being connected at its lower end to a rearward extension 46 of the lower platform 24, which extension is supported by the rear wheels 22 of the rail truck.

The upper or raised platform 40 has mounted thereon a fifth wheelplate assembly 48 which is apertured to receive the kingpin 50 carried by the forward end of the next trailer T. Consequently, with reference to FIG. 2, the wheels W at the rear end of one trailer Ta are supported on the turntable 26 above the lower platform 24 of the elongated dropframe rail truck 14, and the forward end of the next trailer Tb is supported on the raised platform 40 of the same rail truck 14 by means of the fifth wheelplate assembly 48 which receives and retains the kingpin 50 provided at the underside of the forward end of the trailer Tb. It will of course be understood that the height of the fifth wheelplate assembly 48 on the raised platform 40 relative to the height of the turntable 26 on the lower platform 24 is controlled so that each of the trailers T will be disposed in a generally horizontal position when they are loaded on the several rail trucks 14 as shown in FIG. 1. It is desirable that the fifth wheelplate assembly 48 be adjustable forwardly and rearwardly a limited amount in order to accommodate the precise location of the kingpin 50. For example, for trailers T of a given size, the precise distance between the bogie or wheel assembly at the rear of the trailer and the kingpin at the forward end thereof will vary, due to the fact that it is common to adjust the bogie forwardly and rearwardly depending upon the distribution of load within the trailer. Such adjustment can readily be accommodated by providing a corresponding limited adjustment of the fifth wheelplate assembly 48 on the raised platform 40.

Reference is now made to the connecting rods 16 which interconnect the various rail trucks 14 and comprise the only required structural connections therebetween. It should be understood that the terms "connecting rod" and "connecting member" as used herein and in the appended claims are not intended to be limited to a specific form of structural link, since various forms are envisioned within the scope of the present invention. The important function of such connecting rods is that they be able to function as tension links and interconnect the various rail trucks 14 so that the latter may be pulled by a single engine 10.

Moreover, in some applications of the present invention to a "piggyback" train, it may be desirable to operate the engine from the rear car so that the engine will push the train, thus avoiding the need for turning the train around when it reaches its destination. In an application of the latter type, it is obvious that the connecting rods must also be adapted to function as compression members. Accordingly, the connecting rods 16 may be referred to as push-pull rods, indicating that they may be in compression or in tension depending upon whether the train is being pushed or is being pulled. However, it is important to note that virtually any shape of structural member capable of performing such functions may be utilized.

For example, as shown in FIGS. 3 and 4, the connecting rod may comprise an inner tubular section 16a and an outer tubular section 16b, with the inner tube being telescoped within the outer tube. Thus, the length of the overall connecting rod may be adjusted by telescoping the inner tubular member within the outer tubular member, the desired overall length being determined by the trailer length to be accommodated, and then the inner and outer sections may be pinned together or otherwise fixedly secured to one another.

It will be understood that the ordinary adjustments necessitated by variations in the positions of the trailer bogie members are accommodated by a simple adjustment of the position of the fifth wheelplate assembly 48 as described hereinabove, whereas adjustment of the length of the connecting rod 16 is made only infrequently, as when it is desired to change the distance between the rail trucks 14 to accommodate trailers of a different length. Nevertheless, it is considered an important feature of the invention that adjustments can be made in the length of the connecting rods 16, such adjustments being the equivalent of varying the overall length of a conventional "piggyback" railroad car. As mentioned above, the connecting rods 16 need not be tubular in configuration, and various other configurations such as channel sections, I-beams, etc. may be used. It is however preferred that each connecting rod comprise a pair of sections capable of telescoping action or equivalent movement relative to one another to permit the foregoing adjustment.

The connecting rods 16 may be secured to the respective ends of the rail trucks 14 by vertical hinge pins. Thus, one end of a connecting rod 16 may be secured to the forward end of a rail truck 14 by a vertical hinge pin 52 as shown at the left hand end of FIG. 2. In a similar manner, the forward end of each connecting rod 16 may be connected to the rear of the rail truck next ahead of it in the train by means of a vertical hinge pin 54 as shown at the right hand end of FIG. 2.

In accordance with one preferred mode of operation of the present invention, the several elongated dropframe rail trucks 14 are permanently coupled together so as to operate as a unit train, the rail trucks being uncoupled only for purposes of maintenance. Such a "piggyback" train constructed in accordance with the present invention may thus operate as a unit without going through yards. It will further be noted that by coupling the rail trucks 14 together in the foregoing manner, there is virtually no slack, thereby affording smoother operation.

FIGS. 6, 8 and 9 show a gripper device, indicated generally at 56, such device being mounted on the raised platform 40 of each rail truck 14 for the purpose of gripping a trailer kingpin 50, and being provided in place of the fifth wheelplate assembly 48 described in conjunction with Fig. 2. In order to understand the function of the gripper device 56, it should first be noted in conjunction with FIGS. 3–5 that the preferred procedure for loading a trailer T on a train of the type shown in FIG. 1 is to back the trailer up to one of the turntables 26 as shown in FIG. 3. The turntable 26 is first rotated 90 degrees from its normal in-line position to a side position, and the ramp 36 on the turntable is pivoted downwardly so as to engage the ground, e.g., a paved siding alongside the tracks.

The trailer T is positioned perpendicular to the tracks and is backed up to the turntable 26 as shown in FIG. 3, the trailer being backed up onto the turntable until the wheels of the trailer approximately abut the backup shoes 34 provided at the rear of the turntable 26. The driver then drops the landing gear of the trailer and detaches the tractor, leaving the trailer in the position shown in FIG. 4. Thereafter, a special lift truck 57 is used to lift the trailer off its landing gear and swing the front of the trailer around, lowering the kingpin 50 in the fifth wheelplate 48 described hereinabove, at which time the trailer is in the position shown in FIG. 5.

The foregoing loading procedure as illustrated in FIGS. 3–5 has one disadvantage in that it requires that the area between the tracks be paved and it also requires a special lift truck which is designed so that it can move close enough to the tracks to deposit the kingpin 50 in the fifth wheelplate 48 without interfering with the rail truck structure. Moreover, it will be understood that if the lift truck 57 engages the kingpin 50 when it swings the trailer around from the FIG. 4 position to the FIG. 5 position, then the lift truck must be operated to first position the forward end of the trailer on the fifth wheelplate 48 without locating the kingpin in the aperture of the fifth wheelplate, and thereafter the lift truck must be further operated to pick up the forward end of the trailer other than at the kingpin while leaving the kingpin exposed so that the kingpin may be lowered into the aperture provided therefor in the fifth wheelplate. Alternatively, the lift truck must initially lift the forward end of the trailer and swing the same around to the FIG. 5 position without covering the kingpin, since the latter must remain exposed so as to enable it to be lowered into the aperture in the fifth wheelplate.

I have developed an alternative embodiment of the invention which avoids all of the foregoing problems, such alternative embodiment being illustrated in FIGS. 6–9. In accordance with the latter embodiment a loading tractor or lift truck 58 may be utilized to swing the front end of the trailer T around to the position shown in dash-dot lines in FIG. 6 where the trailer still defines a small angle relative to its in-line position of FIG. 5. The tractor 58 lowers the trailer so that the kingpin 50 is disposed between the jaws 60 and 62 of the gripper device 56 as shown in FIG. 8. The latter device is actuated by train power to close the jaws 60 and 62 on the kingpin 50 and then draw the kingpin into an in-line or centered position as represented in FIG. 9. Thus, an air-powered piston rod and cylinder assembly 64 is provided for controlling the closing of the jaws 60 and 62, and an air-powered pinion and rack mechanism is shown generally at 66 for retracting the gripper 56 into its fully retracted position of FIG. 9.

The gripper and retractor devices 56 and 66 eliminate the problems discussed above since the loading tractor need not move close enough to the tracks to transport the front end of a trailer to its fully centered position, since the tractor can release the trailer in the position shown in dash-dot lines in FIG. 6. Moreover, when unloading a trailer from the train, the loading operation is simply carried out in reverse, and the devices 56 and 66 may thus be operated to swing the front end of a trailer to the dash-dot line position of FIG. 6 and release the kingpin 50, after which the tractor 58 is utilized to swing the trailer out 90° to the position shown in solid lines in FIG. 6 whereby it may then be pulled off the turntable 26.

As shown in FIGS. 6 and 7, the loading tractor 58 includes an elongated hydraulic lift 68 which is generally U-shaped or channel-shaped in cross section and is adapted to support the kingpin 50 of a trailer T. Thus, an operator positions the tractor 58 so that the kingpin 50 of the trailer is disposed in a centered position in the elongated U-shaped lift 68. The lift 68 is operated to lift the trailer a few inches, and the tractor is then operated to swing the trailer around to drop the kingpin into the gripper device 56.

It will be understood that if the tractor 58 is driven away from the desired arcuate path which it is to take while swinging around the front of a trailer, the kingpin 50 will move to one side or the other of its initially centered position in the elongated U-shaped lift 68. The operator, by simply observing any relative movement of the kingpin from its initially centered position, can then make whatever steering adjustment is necessary to maintain the desired arcuate path of travel.

It is believed that an optimum size "piggyback" train for practicing the present invention may comprise approximately 20 of the elongated drop frame rail trucks described herein. Such trains would be relatively lightweight because of the elimination of the conventional car body. Moreover, the center of gravity of the trailers is unusually low due to the dropframe design of the trucks, and clearance requirements are substantially reduced. The connecting rods 16 may be utilized to carry the train controls, air lines and bearing surveillance wiring for the length of the train. A train of the foregoing type having 20 rail trucks is capable of transporting 20 40-foot trailers. The rail trucks 14 are interconnected with connecting rods or push-pull tubes 16 which normally can remain connected so as to provide a unit train, and there is no coupler slack since the trucks have pinned connections to the push-pull tubes.

Further important advantages of the present invention are that any type of trailer may be transported on the rail trucks, and side loading is provided so as to afford random access to trailers without requiring any expensive cranes or other special lifting equipment. A gripper device 56 is preferably provided on the raised platform 40 of the rail truck 14 to receive and hold the kingpin 50 at the forward end of a trailer, and the gripper device is preferably adjustable a limited amount forwardly and rearwardly to accommodate variations in the precise location of a kingpin. In addition, it may be desirable to build a longitudinal cushioning apparatus into the gripper mechanism so that the member which holds the kingpin is longitudinally cushioned against shocks.

When a train of the foregoing type is spotted in a small community, trailers can be backed on or taken off by local drivers, or by the train crew if the train is only spotted there while loading or unloading takes place. Yard facilities need be nothing more than one or two small sections of crushed stone paving slightly higher than the track. The loading tractor 58 can either be part of the yard equipment or carried in a rear car of the train. Only one man is needed to swing the trailers around for purposes of loading or unloading. Since the engine is normally coupled to the train, the train can be indexed forward as each trailer is loaded or unloaded, thus minimizing the number of paved areas required.

While I have described my invention in certain preferred forms, I do not intend to be limited to such forms, except insofar as the appended claims are so limited, since modifications coming within the scope of my invention will readily occur to those skilled in the art, particularly with my disclosure before them.

I claim:

1. For use in "piggyback" rail transportation of highway trailers, the improvement comprising, in combination, a plurality of side loading and unloading rail trucks each having a first platform for supporting the wheels of a first trailer and a second platform for supporting the forward end of a second trailer adjacent to said first trailer, a plurality of connecting members for interconnecting said rail trucks, each of said connecting members serving to connect one of said rail trucks to the next adjacent rail truck and being of a length determined by the length of the trailers to be transported so as to space said rail trucks a predetermined distance apart whereby a plurality of trailers may be transported with each trailer having its wheels supported on the first platform of one of said rail trucks and its forward end supported on the second platform of the next adjacent rail truck, each of said rail cars being of a dropframe design with said first platform disposed at a substantially lower level than said second platform, and automatic transport means carried by said rail car and associated with said second platform for engaging the kingpin at the front end of a trailer and moving the same in either direction between a first position where said trailer is disposed in a fully loaded position on said rail car and a second position wherein the front end of said trailer is swung outwardly over a loading dock while said trailer wheels are disposed on said first platform of said rail car, said transport means thus serving to swing said trailer about a vertical axis located proximate said wheels to permit side loading and unloading of said trailer from said rail car without disconnecting any of said connecting members.

2. The invention of claim 1 where said first platform includes turntable means supporting the wheels of said trailer to facilitate the swinging of the front of said trailer about its wheels during the side loading and unloading thereof, said turntable means being independent of said connecting means.

3. The invention of claim 1 where said first platform is disposed at a level below the axes of the wheels of said rail car and said second platform is disposed substantially above the axes of said wheels.